(12) United States Patent
Gray

(10) Patent No.: US 11,343,095 B2
(45) Date of Patent: May 24, 2022

(54) CRYPLET BINDING KEY GRAPH

(71) Applicant: Microsoft Technology Licensing, LLC, Redmond, WA (US)

(72) Inventor: John Marley Gray, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 331 days.

(21) Appl. No.: 15/709,288

(22) Filed: Sep. 19, 2017

(65) Prior Publication Data

US 2019/0089537 A1 Mar. 21, 2019

(51) Int. Cl.
| | |
|---|---|
| *H04L 9/32* | (2006.01) |
| *H04L 9/08* | (2006.01) |
| *H04L 9/14* | (2006.01) |
| *H04L 9/06* | (2006.01) |
| *H04L 9/30* | (2006.01) |
| *G06F 21/53* | (2013.01) |
| *G06Q 20/38* | (2012.01) |
| *H04L 29/06* | (2006.01) |
| *G06Q 20/32* | (2012.01) |

(52) U.S. Cl.
CPC ............ *H04L 9/3226* (2013.01); *G06F 21/53* (2013.01); *G06Q 20/3226* (2013.01); *G06Q 20/385* (2013.01); *G06Q 20/3825* (2013.01); *G06Q 20/3829* (2013.01); *H04L 9/0637* (2013.01); *H04L 9/0894* (2013.01); *H04L 9/14* (2013.01); *H04L 9/30* (2013.01); *H04L 63/06* (2013.01); *G06Q 2220/00* (2013.01); *H04L 2209/12* (2013.01)

(58) Field of Classification Search
None
See application file for complete search history.

(56) References Cited

U.S. PATENT DOCUMENTS

| | | |
|---|---|---|
| 9,379,890 B1 | 6/2016 | Blakely et al. |
| 2009/0125545 A1 | 5/2009 | Koo et al. |
| 2012/0036364 A1* | 2/2012 | Yoneda ................. H04L 9/3249 713/175 |

(Continued)

OTHER PUBLICATIONS

Pasdar et al., Blockchain Oracle Design Patterns, 2021 arXIV.2106.09349, pp. 1-25 (Year: 2021).*

(Continued)

*Primary Examiner* — Roderick Tolentino
*Assistant Examiner* — Edward X Long
(74) *Attorney, Agent, or Firm* — Workman Nydegger

(57) ABSTRACT

The disclosed technology is generally directed to secure transactions. In one example of the technology, a first enclave to be used for executing a cryptlet binary of a first cryptlet is identified. The first enclave may be a secure execution environment that stores an enclave private key, and the first cryptlet may be associated with at least a first counterparty. A cryptlet binding that is associated with the first cryptlet may be generated, and may include counterparty information that is associated with at least the first counterparty. Cryptlet binding information may be provided to a cryptlet binding key graph, and a location of a first hardware security module (HSM) that stores a key that is associated with the first counterparty may be received from the cryptlet binding key graph.

20 Claims, 5 Drawing Sheets

(56) References Cited

U.S. PATENT DOCUMENTS

| | | | |
|---|---|---|---|
| 2015/0082041 A1 | 3/2015 | Gaspar cuevas | |
| 2015/0222604 A1* | 8/2015 | Ylonen | H04L 9/083 |
| | | | 713/171 |
| 2016/0191241 A1 | 6/2016 | Allen | |
| 2016/0357550 A1* | 12/2016 | Thomas | G06F 8/77 |
| 2017/0006003 A1 | 1/2017 | Zakaria et al. | |
| 2017/0126642 A1* | 5/2017 | Basin | H04L 9/3226 |
| 2018/0167217 A1* | 6/2018 | Brady | H04L 67/10 |
| 2018/0208448 A1* | 7/2018 | Zimmerman | H04W 4/70 |
| 2019/0081796 A1* | 3/2019 | Chow | H04L 9/30 |

OTHER PUBLICATIONS

Singh et al., Blockchain As a Service Providers and Trust, 2017, Research Paper No. 269/2017, pp. 1-16 (Year: 2017).*

Rhodes, et al., "azure-blockchain-project", https://github.com/Azure/azure-blockchain-projects/blob/master/bletchley/CryptletsDeepDive.md, Published on: Nov. 10, 2016, 18 pages.

Wong, et al., "Secure Group Communications Using Key Graphs", In Journal of IEEE/ACM Transactions on Networking, vol. 8, Issue 1, Feb. 2000, pp. 68-79.

Treat, et al., "BlockChain Security", https://www.accenture.com/t20170215T065935_w_/US-en/_aenmedia/PDF-43/Accenture-Blockchain-POV.pdf, Retrieved on: Mar. 28, 2017, 1-7 pages.

Gibson, et al., "Blockchain 101 for Asset Managers", In Journal of the Investment Lawyer, vol. 23, No. 10, Oct. 2016, pp. 1-8.

Anonymous, et al., "Project Bletchley—The Cryptlet Fabric", Retrieved from: <<https://github.com/Azure/azure-blockchain-projects/blob/master/bletchley/CryptletsDeepDive.md», Apr. 17, 2017, 17 Pages.

Gray, Marley, "Enterprise Smart Contracts", Retrieved from: <<https://github.com/Azure/azure-blockchain-projects/blob/master/bletchley/EnterpriseSmartContracts.md>>, Jul. 1, 2017, 9 Pages.

"International Search Report and Written Opinion Issued in PCT Application No. PCT/US2018/039641", dated Sep. 21, 2018, 12 Pages.

Plastina, Dan, "Azure Key Vault—Making the cloud safer", Retrieved from: <<https://blogs.technet.microsoft.com/kv/2015/01/08/azure-key-vault-making-the-cloud-safer/>>, Jan. 8, 2015, 10 Pages.

* cited by examiner

CRYPLET BINDING KEY GRAPH

BACKGROUND

Blockchain systems have been proposed for a variety of application scenarios, including applications in the financial industry, health care, IoT, and so forth. For example, the Bitcoin system was developed to allow electronic cash to be transferred directly from one party to another without going through a financial institution. A bitcoin (e.g., an electronic coin) is represented by a chain of transactions that transfers ownership from one party to another party. To transfer ownership of a bitcoin, a new transaction may be generated and added to a stack of transactions in a block. The new transaction, which includes the public key of the new owner, may be digitally signed by the owner with the owner's private key to transfer ownership to the new owner as represented by the new owner public key.

Once the block is full, the block may be "capped" with a block header that is a hash digest of all the transaction identifiers within the block. The block header may be recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain may create a mathematical proof of ownership in an entity represented by a security identity (e.g., a public key), which in the case of the bitcoin system is pseudo-anonymous.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to secure transactions and confidential execution of logic. In one example of the technology, a first enclave to be used for executing a cryptlet binary of a first cryptlet is identified. In some examples, the first enclave is a secure execution environment, the first enclave stores an enclave private key, and the first cryptlet is associated with at least a first counterparty. A cryptlet binding that is associated with the first cryptlet may be generated. In some examples, the cryptlet binding includes counterparty information that is associated with at least the first counterparty. Cryptlet binding information may be provided to a cryptlet binding key graph. A location of a first hardware security module (HSM) that stores a key that is associated with the first counterparty may be received from the cryptlet binding key graph.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
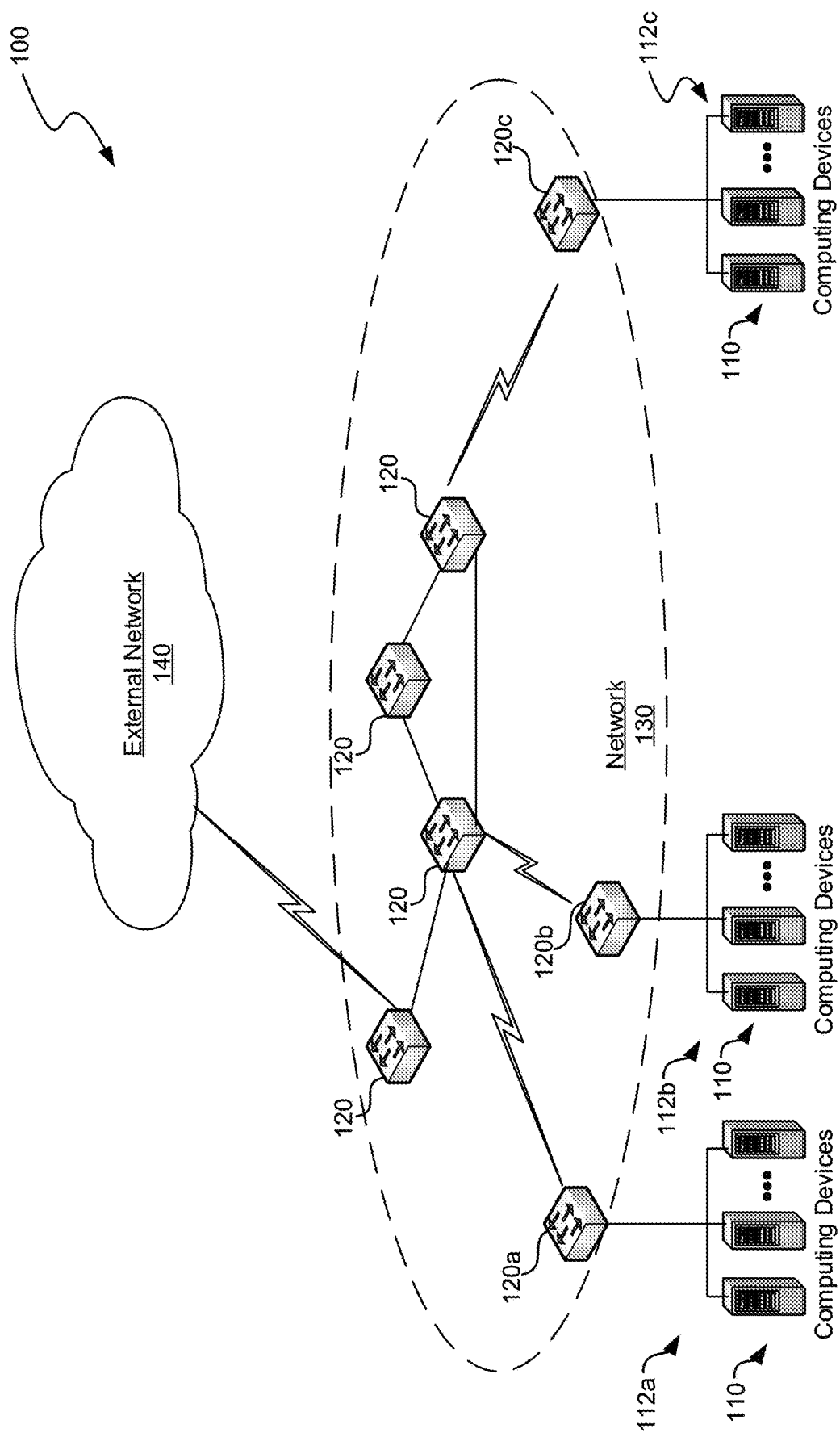
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to secure transactions. In one example of the technology, a first enclave to be used for executing a cryptlet binary of a first cryptlet is identified. In some examples, the first enclave is a secure execution environment, the first enclave stores an enclave private key, and the first cryptlet is associated with at least a first counterparty. A cryptlet binding that is associated with the first cryptlet may be generated. In some examples, the cryptlet binding includes counterparty information that is associated with at least the first counterparty. Cryptlet binding information may be provided to a cryptlet binding key graph. A location of a first hardware security module (HSM) that stores a key that is associated with the first counterparty may be received from the cryptlet binding key graph.

In some examples, a cryptlet is a code component that can execute in a secure environment and be communicated with using secure channels. One application for cryptlets is smart contracts. In some examples, a smart contract is computer code that partially or fully executes and partially or fully enforces an agreement or transaction, such as an exchange of money and/or property, and which may make use of blockchain technology. Rather than running the logic of a smart contract in the blockchain itself, in some examples, the logic may instead be done by cryptlets executing off of the blockchain. In some examples, the blockchain may still be involved in some manner, such as in tracking the state, and receiving the output of the cryptlet.

Some or all of the cryptlet code may be associated with a constraint to execute in a secure environment. Accordingly, some of the cryptlet code may be run in an enclave. In some examples, an enclave is an execution environment, provided by hardware or software, that is private, tamper resistant, and secure from external interference. In some examples, outputs from the cryptlet code are signed by the cryptlet private key as well as the host enclave's private enclave key of an enclave key pair stored by the enclave. The outputs can be attested to out of band from the blockchain, e.g., with the public key of the cryptlet and the enclave. Enclaves for use by cryptlets may be pooled in some examples. Pooling of enclaves may allow for enclaves to be provisioned on demand, e.g., at runtime, based on the secure compute needs of running applications.

For a cryptlet to be executed, a cryptlet binding may generated, where the cryptlet binding includes bindings for the cryptlet. In some examples, each of these bindings is a mapping between the cryptlet and another cryptlet, a smart contract, or an identification of a counterparty to the smart contract.

While an enclave is a secure execution environment, an enclave does not necessarily have memory that persists over multiple enclaves. Secrets that need to be stored longer than the execution of a cryptlet with one enclave can be stored in a hardware security module (HSM), such as a key vault or other enclave. In some examples, the HSM is a secure execution environment with storage that can be stored long enough for use by multiple enclaves. A secure tunnel may be used to communicate keys and other secrets between an enclave lacking storage that persists over multiple enclaves and an HSM that has storage long enough for use by multiple enclaves.

There may be multiple customer key vaults and dynamic cryptlet interactions across counterparty secrets. Some key vaults may be in the same network as the cryptlet fabric, and other key vaults may be private key vaults stored by a customer or may be dedicated key vaults not shared with other members of the consortium.

Keys that need to be determined from an HSM may be determined based on the cryptlet binding. In the case of a counterparty key, the cryptlet binding may be communicated to a cryplet binding key graph. In some examples, the cryptlet binding key graph determines the location of any necessary counterparty keys based on counterparty information contained in the cryptlet binding. The cryptlet binding key graph may communicate the locations of the counterparty keys so that the counterparty keys can be retrieved via a secure tunnel.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/ or other suitable computing services.

In some examples, one or more of the computing devices 110 is an IoT device, a device that comprises part or all of an IoT support service, a device comprising part or all of an application back-end, or the like, as discussed in greater detail below.

Illustrative Computing Device

Figure 2:
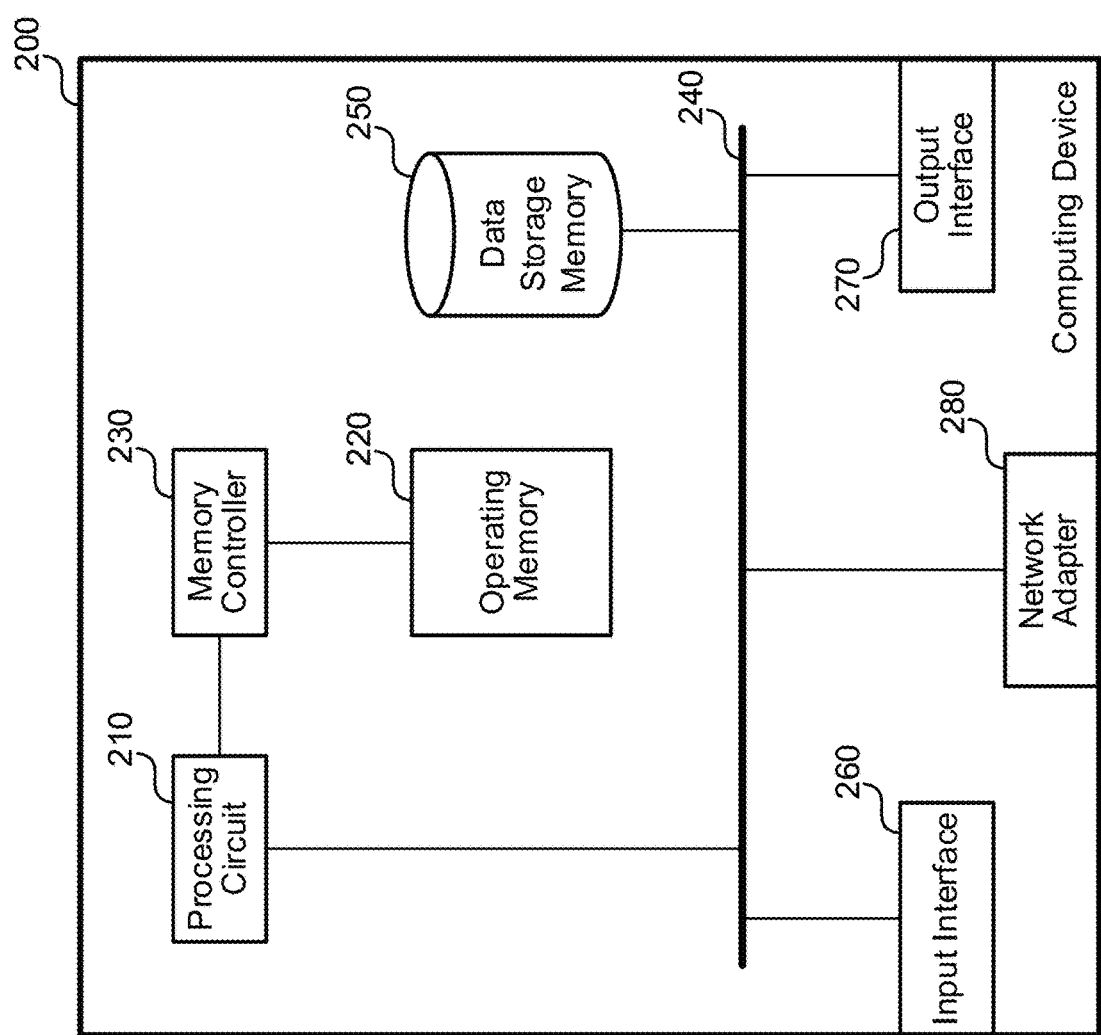
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
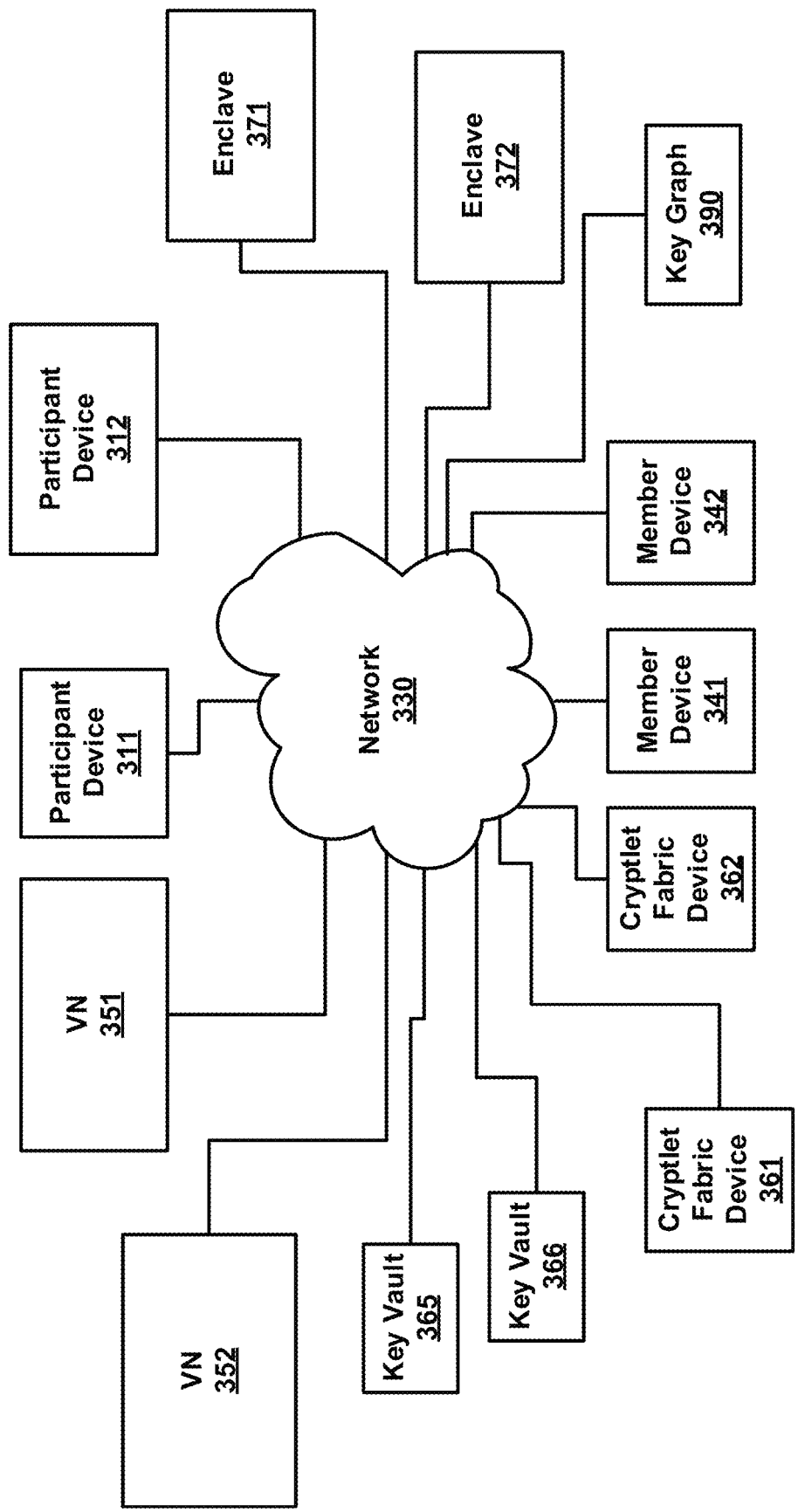
FIG. 3 is a block diagram illustrating an example of a system.

FIG. 3 is a block diagram illustrating an example of a system (300). System 300 may include network 330, as well as participant devices 311 and 312, member devices 341 and 342, validation nodes (VNs) 351 and 352, enclaves 371 and 372, cryptlet fabric devices 361 and 362, key vaults 365 and 366, and key graph 390, which all may connect to network 330.

Each of the participant devices 311 and 312, member devices 341 and 342, VNs 351 and 352, cryptlet fabric devices 361 and 362, key vault 365 and 366, and/or key graph 390 may include examples of computing device 200 of FIG. 2. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some IoT devices may be connected to a user device via a different network in network 330 than other IoT devices. In essence, network 330 includes any communication technology by which information may travel between participant devices 311 and 312, member devices 341 and 342, VNs 351 and 352, cryptlet fabric devices 361 and 362, enclaves 371 and 372, key vault 365 and 366, and/or key graph 390. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

In some examples, VNs 351 and VN 352 are part of a blockchain network. In some examples, VNs 351 and 352 are devices that, during normal operation, validate and process submitted blockchain transactions, and execute chaincode. In some examples, member devices 341 and 342 are devices used by members to communicate over network 330, such as for communication between a member and its corresponding VN, for example to endorse a VN. In some examples, participant devices 311 and 312 are devices used by participants to communicate over network 330, such as to request a transaction.

An example arrangement of system 300 may be described as follows. In some examples, enclaves 371 and 372 are execution environments, provided by hardware or software, that are private, tamper resistant, and secure from external interference. Outputs from an enclave are digitally signed by the enclave. Cryptlet fabric devices 361 and 362 are part of a cryptlet fabric that provides runtime and other functionality for cryptlets, as discussed in greater detail below. Key graph 390 may be used to determine the location of a counterparty key responsive to counterparty information concerning the key. In some examples, key graph 390 is contained in a ledger that includes a smart contract database. Key vault 365 and/or key vault 366 may be used to provide secure persistent storage for keys used by cryptlets for identity, digital signature, and encryption services. "Persistent" storage, as the term is used herein, is not necessary "permanent" storage. In some examples, "persistent" storage is relatively short but last through multiple enclaves. In some examples, "persistent" storage is relatively long-term.

System 300 may include more or less devices than illustrated in FIG. 3, which is shown by way of example only.

Illustrative Device

Figure 4:
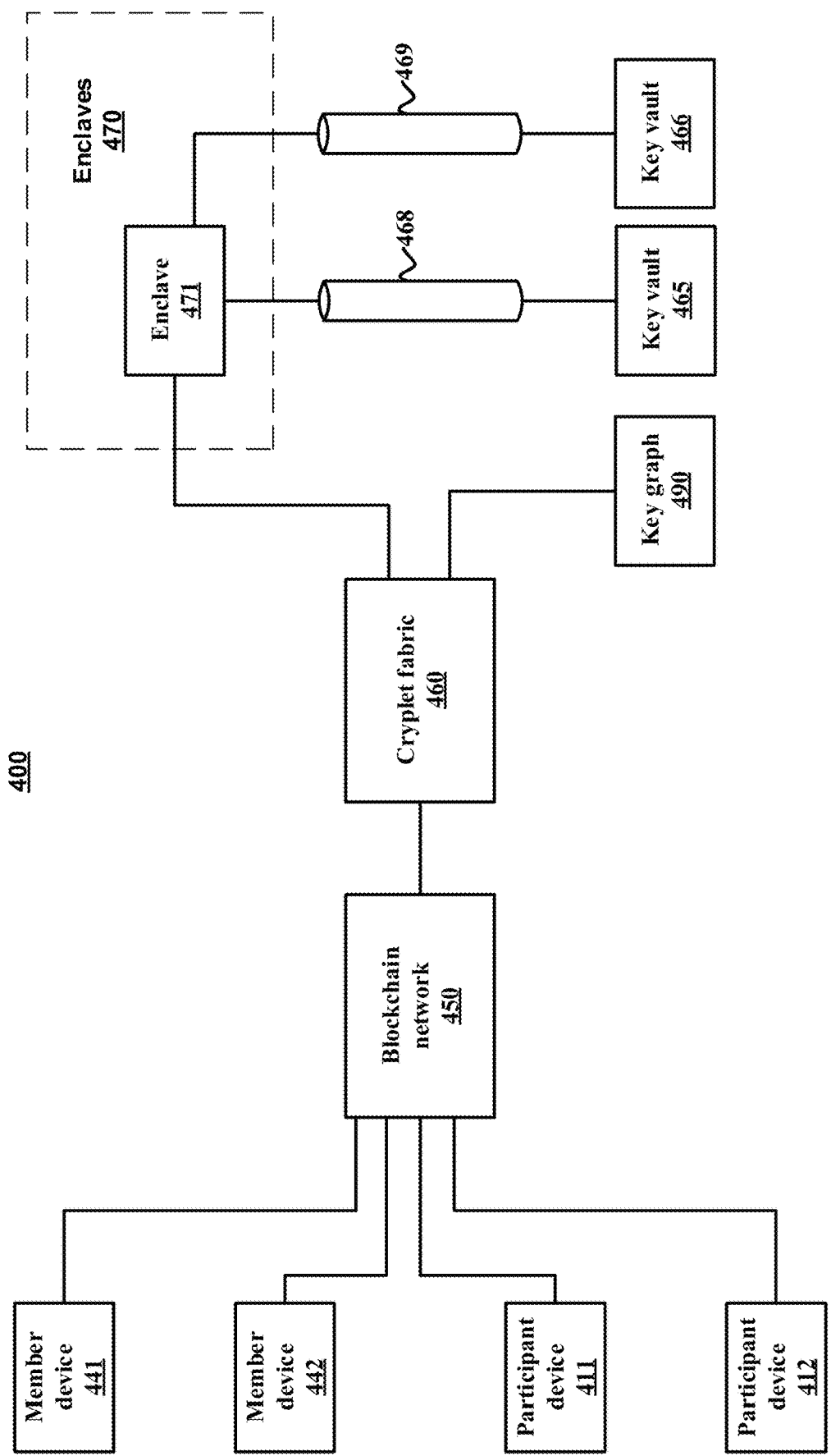
FIG. 4 is a block diagram illustrating an example of the system of FIG. 3.

FIG. 4 is a block diagram illustrating an example of system 400, which may be employed as an example of system 300 of FIG. 3. System 400 may include participant devices 411 and 412, member devices 441 and 442, blockchain network 450, cryptlet fabric 460, enclaves 470, key vaults 465 and 466, and key graph 490. Enclaves 470 include enclave 471.

In some examples, during normal operation, blockchain network 450 may validate and process submitted blockchain transactions. In some examples, member devices 441 and 442 are devices used by members to communicate with blockchain network 450. In some examples, participant devices 411 and 412 are devices used by participants to communicate with blockchain network 450, such as to request a transaction. In some examples, enclaves 470, including enclave 471, are execution environments, provided by hardware or software, that are private, tamper-resistant, and secure from external interference. In some examples, outputs from an enclave are digitally signed by the enclave. In some examples, key graph 490 is contained in a ledger that includes a smart contract database. Key vault 465 and/or key vault 466 may be used to provide secure persistent storage for keys used by cryptlets for identity, digital signature, and encryption services.

Blockchain network 450 may include a number of VNs. In some examples, each member of blockchain network 450 may, via a member device (e.g., 441 or 442), maintain one or more VNs in blockchain network 450. Participants may request, via participant devices (e.g., 411 or 412) for transactions to be performed by blockchain network 450. During normal operation, VNs in blockchain network 450 validate and process submitted transactions, and execute blockchain code.

Transactions performed by the blockchain network 450 may be stored in blockchains. In some examples, blockchains are decentralized ledgers that record transactions performed by the blockchain in a verifiable manner. Multiple transactions may be stored in a block. Once a block is full, the block may be capped with a block header that is a hash digest of all of the transaction identifiers within a block. The block header may be recorded as the first transaction in the next block in the chain, thus creating a blockchain.

A blockchain network may also be used for the processing of smart contracts. In some examples, a smart contract is computer code that partially or fully executes and partially or fully enforces an agreement or transaction, such as an exchange of money and/or property, and which may make use of blockchain technology. Rather than running the logic of a smart contract in the blockchain itself, the logic may instead, with assistance from cryptlet fabric 460, be done by cryptlets executing off of the blockchain network 450. In some examples, a cryptlet is a code component that can execute in a secure environment and be communicated with using secure channels. In some examples, cryptlet fabric 460 is configured to provide runtime and other functionality for cryptlets.

In some examples, Cryptlet Fabric 460 a server-less cloud platform that provides core infrastructure for middleware that enables blockchain-based applications with increased functionality. In some examples, Cryptlet Fabric 460 is comprised of several components providing the functionality for an enhanced security envelop of blockchain application into the cloud as well as a common application program interface (API) that abstracts the underlying blockchain and its nuance from developers.

In some examples, Cryptlet Fabric 460 manages scale, failover, caching, monitoring, and/or management of cryptlets, as well as a run time secure key platform for cryptlets that allows for the creation, persistence, and hydration of private keys at scale. ("Hydration" refers to the activation and orchestration in memory from persistent storage.) This allows cryptlets to create, store and use key pairs in a secure execution environment to perform a variety of functions including, for example, digital signatures, ring signatures, zero knowledge proofs, threshold, and homomorphic encryption.

In some examples, a cryptlet may be a software component that inherits from base classes and implements interfaces that provide cryptographic primitives and integrations for distributed trust applications. In some examples, it is sufficient for developers to know the base classes and how to implement required and optional interfaces for cryptlets to develop on the platform. Established software development frameworks, patterns, and designs can be used for user interfaces and integration into existing systems.

Types of cryptlets may include utility cryptlets and contract cryptlets. Utility cryptlets usually perform external data integration via events internal or external, provide data access or reusable logic to blockchain smart contracts, but can also provide service level APIs for other systems to work with blockchains. Utility cryptlets whose primary purpose is to inject attested data into blockchains may be called "oracle" cryptlets. In some examples, contract cryptlets contain smart-contract-specific logic that counter-parties signing the contract agree to. Both types of cryptlets may provide a blockchain facing API and a Surface level API.

Regardless of how a smart contract is implemented, utility cryptlets may be used to provide information and additional computation for smart contracts in reusable libraries. These libraries may be used to create a framework for building distributed applications and exposed in a common way via the Cryptlet Fabric 460 in both public and private cloud, and in blockchain environments.

Contract cryptlets may redefine the implementation of the logic that a smart contract executes. In some examples, these cryptlets prescribe that any logic be run off-chain, using the underlying blockchain as a database.

Utility cryptlets may provide discrete functionality like providing external information, e.g., market prices, external data from other systems, or proprietary formulas. These may be called "blockchain oracles" in that they can watch and inject "real world" events and data into blockchain systems. Smart contracts may interact with these using a Publish/Subscribe pattern where the utility cryptlet publishes an event for subscribing smart contracts. The event triggers may be external to the blockchain (e.g., a price change) or internal to the blockchain (e.g., a data signal) within a smart contract or operation code.

In some examples, these cryptlets can also be called directly by other cryptlets within the fabric and expose an external or surface level API that other systems can call. For example, an enterprise Customer relationship management (CRM) system may publish an event to a subscribing cryptlet that in turn publishes information to a blockchain in blockchain network 450 based on that information. Bi-directional integration may be provided to smart contracts and blockchains through Cryptlet Fabric 460 in this way.

Contract or control cryptlets may represent the entire logic or state in a contractual agreement between counter parties. In some examples, contract cryptlets used in smart contract-based systems can use the blockchain ledger to authentically store a contract's data using smart contract logic for data validity, but surrogate logic to a contract cryptlet providing "separation of concerns" within an application's design. The relationship between an on-chain smart contract and a contract cryptlet may be called a trust relationship.

For non-smart contract based systems, in some examples, contract cryptlets perform logic and write their data to the blockchain without the smart contract or well-defined schema on the blockchain.

In essence, in some examples, contract cryptlets can run the logic of a contractual agreement between counterparties at scale, in a private secure environment, yet store its data in the underlying blockchain regardless of type.

In some examples, a cryptlet has common properties regardless of type:

Identity—For example, a key pair. The identity can be created by the cryptlet itself or assigned. The public key is also known as the cryptlet address. The private key may be used to sign all transactions from the cryptlet. Private keys may be stored in the KeyVault 465 or otherwise fetched via secure channel when rehydrating or assigning identity to a cryptlet.

Name—A common name that is mapped to the address for a more readable identity in some examples.

Code—code written in a language that's its Parent Container supports in some examples.

CryptletBindings—a small list of bindings that represent the client (e.g., blockchain contracts or accounts) addresses and parameters for the binding in some examples.

Events—List of events published or watched by the cryptlet in some examples. These event triggers can be watched blockchain data or events or external in some examples.

API—A set of surface level APIs that non-blockchain systems or other cryptlets can use as well as subscriber call back methods in some examples.

Parent Container—A cryptlet container that the cryptlet runs in, in some examples.

Manifest—simple JavaScript Object Notation (JSON) configuration settings for a cryptlet that is used for deployment into the fabric, in some examples.

A cryptlet container may provide a runtime for Cryptlets to execute in. Cryptlet containers may provide abstractions for Cryptlets like I/O, security, key management, and runtime optimization.

Cryptlet containers may provide secure key storage and retrieval for cryptlets to use for identity, digital signatures and encryption. Cryptlets may automatically store and fetch keys via the cryptlet container which integrates with a key vault, such as the key vault 465 via a secure channel or cryptlet tunnel, such as cryptlet tunnel 468, or such as key vault 466 via a secure channel or cryptlet tunnel, such as cryptlet tunnel 469.

A cryptlet may declare in the manifest its configuration, enclaving, type, etc. In some examples, the cryptlet container ensures that the dependencies the cryptlet needs are in place for it to run.

Enclave requirements for a cryptlet may be set in the cryptlet manifest or in policy. Enclave options and configuration are set in the cryptlet container service, which is part of Cryptlet Fabric 460 in some examples.

In some examples, the cryptlet container service is the hub of the Cryptlet Fabric 460. In some examples, the primary duties and components of the cryptlet container service are:

Cryptlet Fabric Registry, which is the Registry and Database for configuration.
   Cryptlets: Name and ID, Surface Level API, and Events they expose to blockchain networks.
   Blockchains or other distributed ledgers: Network Name, Type, Node List, metadata.
   Smart contracts: on-chain smart contract addresses and application binary interfaces (ABIs) or other interface definition that subscribe to or have trust relationships with Cryptlets as well as the host blockchain network.

CryptletBindings, which is a collection of all bindings the fabric serves. A CryptletBinding may map smart contracts to cryptlets or cryptlets to cryptlets for validation and message routing. A CryptletBinding may represent a single binding between a smart contract and a cryptlet (or pair/ring). Details about the binding like subscription parameter(s), interface parameter(s), and/or smart contract address are used to route messages between cryptlets, their clients, smart contracts, or other cryptlets.

Secure Compute Registry: is a registry of enclaves and their attributes like capabilities, version, costs, and configuration. Enclave pool definitions of clusters and additional cryptographic services provided by Enclave Pools like key derivation, ring signatures, and threshold encryption.

Cryptlet Catalog, which may be a REpresentational State Transfer (REST) API and/or Web Site for developers to discover and enlist cryptlets into their applications either for a smart contract binding or for use in building a user interface or integration.

API for abstracting blockchain transaction formatting and Atomicity, Consistency, Isolation, Durability (ACID) delivery append transactions and read queries from cryptlets and any other system wanting "direct" access to the underlying blockchain. This API can be exposed in various ways, e.g., messaging via service bus, Remote Procedure Calls (RPCs), and/or REST.

Cryptlets, blockchains and smart contracts may get registered with the cryptlet fabric registry service. The cryptlet container service may publish the Cryptlet Catalog for on-chain smart contract, front end user interface (UI) and systems integration developers discover and use cryptlets. Developers using the service level APIs may interact with the blockchain via cryptlets and not be concerned or even necessarily know they are working with blockchain data. User Interfaces and Integrations to other systems may interact with cryptlet surface level APIs to rapidly integrate and build applications.

Enclaves may be hardware or software. For example, a software enclave can be formed by running a hypervisor or Virtual Secure Machine (VSM). An example of a hardware enclave is a secure hardware enclave such as SGX from Intel. A hardware enclave may have a set of keys that are burned/etched onto the silicon than can be used to sign output from the enclave to serve as an attestation to its secure execution. Usually, there is a 1-1 ratio of code and the enclave it runs in. However, in the cloud, cryptlets may be instantiated dynamically and may or may not get the same hardware enclave.

In some examples, enclave resources are pooled together and categorized based on their capabilities. For example, there may be VSM enclaves and hardware enclaves which may have different performance or memory enhancements over time. Cryptlets may be configured to request any enclave or a specific type of enclave and potentially a higher performance hardware enclave at runtime.

In some examples, enclaves are secure execution environments where code can be run in an isolated, private environment and the results of the secure execution can be attested to have been run unaltered and in private. This means that secrets like private keys can be created and used within an enclave to sign transactions and be proved to third parties to have run within an enclave.

In some examples, to deliver cryptlets at scale, enclaves are pooled by the Cryptlet Fabric 460 upon receiving an enclave pool request. In some examples, an enclave pool acts as a resource where, upon receiving an enclave request for a cryptlet, an enclave can be fetched from the enclave pool by Cryptlet Fabric 460 and allocated to a cryptlet at runtime based on the requirements of that cryptlet.

For example, a policy can be set that all cryptlets running a smart contract between counterparty A and B always requires an SGX V2 Enclave from Intel. Alternatively, the enclave requirement may be left unspecified, so that the least cost (e.g., in terms of money, time, already active, etc.) enclave is provided.

Enclaves 470 are registered within the enclave pool. In some examples, an enclave pool shared signature is generated for the enclave pool, where the enclave pool shared signature is derived from the private key of each enclave in the enclave pool. In some examples, pool management uses just-in-time (JIT) instantiation of enclaves to use them when active, but return them to the pool as soon as the work is done. In some examples, a cryptlet that has an asynchronous lifespan and that will not complete its work can release its enclave at a checkpoint and be re-instantiated in a different enclave. In some examples, switching enclaves produces different attestations that can be validated by the enclave pool shared signature.

In some examples, when a set of enclaves is registered with the Cryptlet Fabric 460, each enclave public key is recorded in the enclave pool registry. In some examples, the characteristics are recorded upon registration and can be modified for pool categories that are not inferred from the hardware. In some examples, once all the enclaves are registered, the keys for all enclaves are used to generate a key pair for the pool which is stored in a key vault, such as Key Vault 465.

At runtime, the CryptletContainerService may determine cryptlets runtime environment dependencies based on its registration or policy and request an enclave out of the enclave pool. The enclave pool may activate an enclave and return its address to the CryptletContainerService, which may then inject the appropriate CryptletContainer. In some examples, the CryptletContainer is provided the cryptlet ID and an active binding, which CryptletContainer uses to fetch the cryptlet binary from secure storage, and run a hash code signature check on the cryptlet, which may be a part of the cryptlet's composite identifier. In some examples, the CryptletContainer then fetches any keys required by the cryptlet from the KeyVault 465 and passes them along with the active cryptlet binding into the constructor of the cryptlet to instantiate it within the enclave. In some examples, cryptlet code executes in the enclave, and the payload is digitally signed by the private key of the enclave.

Once a cryptlet is done with its synchronous work, it may call its checkpoint method which may pass any new keys generated during its session for the CryptletContainer to persist in one or more key vaults (e.g., Key Vault 465 and/or Key Vault 466), and the cryptlet fabric may then release the cryptlet's enclave back to the pool. By returning the enclave, the enclave then becomes available again to be used by another cryptlet.

In some examples, if a Cryptlet requires an enclave that is not available and will not be available within a defined call window, an error is logged, and an exception is thrown.

New enclaves may be added to the enclave pool, which will generate a new shared signature for the pool. In some examples, a shared signature is used when a cryptlet's lifetime spans multiple enclaves and continuity of attestation needs to be established. In some examples, the shared signature is historical, so if a cryptlet is attested across multiple enclaves, the shared signature is checked, and if the current signature does not match, the previous version of the signature is checked until a match is found. In these examples, if no match is found, the attestation chain is not valid.

In this way, in these examples, a rogue enclave cannot contribute to a validated transaction. In these examples, if a rogue enclave contributes to a transaction, the shared enclave signature would not be made, and the attestation chain would not be valid.

In some examples, the cryptlet container service has a Blockchain Router that provides the abstraction API for data operations against blockchains. Each different type of blockchain may have a Blockchain Message Provider or Connector that is plugged into the blockchain router for proper message formatting for each blockchain.

In some examples, blockchain connectors have a valid address on each of the blockchains the blockchain connector serves and signs transactions with the key for this address. In some examples, blockchain connectors run within an enclave for transaction-signing purposes.

The Blockchain router may depend on CryptletBindings for routing messages to the appropriate blockchain connector. The blockchain connector may use the CryptletBinding information to format the messages correctly and to ensure delivery to the targeted recipient.

In some examples, the cryptlet binding is a data structure that provides the abstraction between the cryptlet and underling blockchain, smart contracts, and accounts. The cryptlet binding may or may not be secured itself, as it may only contain identifier(s) of bound components (e.g., unique identifier(s)) that authorized parties use to look up details from other services. In some examples, used in routing messages, the binding provides the cryptlet ID and the Smart Contract ID itself. In some examples, the smart contract address is looked up and is bound to a specific Blockchain ID that maps to a node address.

Data may be enveloped in multiple layers of digital attestations (e.g., signatures) signed by the data producer or "on-behalf of" a user or IOT device, cryptlet, its host enclave and, then the blockchain connector. This layering may be referred to as a signature onion.

The CryptoDelegate may provide an optimization point for verifying these layered signatures before passing on to be validated by all of the nodes, accordingly reducing redundant signature checks, rejecting invalid attestation chains, and/or freeing compute resources.

In some examples, developers can construct their smart contracts using objects against their logic and simply store their object state into the blockchain ledger without having to write a smart contract schema. In some examples, the reverse is also true, and an object model can be built and mapped from an existing smart contract schema. This environment may provide blockchain portability and ease of development for blockchain solutions.

In some examples, the CryptoDelegate is a set of capabilities that are delivered differently based on the underlying blockchain or ledger. In some examples, the CryptoDelegate functions, in essence, as a client-side or node-side integration for the Cryptlet Fabric 460.

Key vaults (e.g., Key Vault 465 and/or Key Vault 466) may provide secure persistent storage of keys used by cryptlets for identity, digital signatures and encryption services. Cryptlet containers may provide abstractions to cryptlets for storing and fetching keys at runtime. If a counterparty key is being fetched, Cryptlet binding key graph 490 may be used to determine the location of the counterparty key (e.g., the address of the key vault that stores the counterparty key). In some examples, cryptlet binding key graph 490 provides the location as part of a unique request data structure that is used to create a Cryptlet Key Tunnel (e.g., cryptlet tunnel 468 and/or cryptlet tunnel 469) to an HSM (e.g., Key Vault 465 or Key Vault 466) that may exist in a customer's network. In some examples, a secure communication channel, called a cryptlet tunnel (e.g., cryptlet tunnel 468 and/or cryptlet tunnel 469), is established between the Key Vault (e.g., Key Vault 465 or Key Vault 466) and the enclave that is hosting the CryptletContainer. In some examples, storage and retrieval of private keys and secrets used by hosted cryptlets are provided automatically and on demand by the CryptletContainer.

For instance, in some examples, when a cryptlet is instantiated within its CryptletContainer host, if its identity is established by a key pair in the key vault, the CryptletContainer will securely fetch and provide the key pair to the cryptlet upon instantiation. Or, if the cryptlet creates its own or a new key pair, these new keys may be automatically stored by the CryptletContainer when the Cryptlet deactivates. In some examples, the cryptlet can then use the private key to sign transactions and messages for delivery. One example of an assigned key is a cryptlet that signs transactions as a specific counter party, corporation, user, or device, to a Smart Contract with the counter party's private key.

In some examples, cryptlets can request keys or secrets from their container for other cryptographic services like encryption, decryption, and signing of messages. In some examples, keys used by cryptlets, either for identity or other cryptographic purposes, are looked up and located by cryptlet fabric 460 using the CryptletBinding. In some examples, the CryptletBinding resolves to either a Cryptlet Instance ID or a CounterpartyId. In some examples, CryptletBinding Key Graph 490 is used to record key locations for resolving and locating keys for a different counterparty in a separate Key Vault 466 instance that may be controlled by that counterparty. Cryptlet tunnel 469 may be used for secure communication with Key Vault 466.

In either case, the location of the key vault may be communicated from cryptlet fabric 460 to the cryptlet container, and the cryptlet container may then communicate securely with the key vault via a secure tunnel. Key derivation for multiple Cryptlet Identities from a single counterparty may provide multiple concurrence instances to be distinguished. Also, in example scenarios for one-time use key derivation scenarios where Key Vault 465 issues or a cryptlet creates a derived key for cryptlet signing, when the signing is done, the derived key may then be destroyed as it was only in enclave memory. Key life cycle services such as key expiration and reset may be provided as utilities.

In some examples, prior to the formation of a smart contract, each counterparty may be registered with a particular key vault, and the counterparty registration may be used in the configuration of cryptlet binding key graph 490.

Besides key vaults, a cryptlet tunnel may be established between an enclave and any suitable Hardware Security Module (HSM)—Key Vault 465 is but one example of an HSM to which the enclave may establish a cryptlet tunnel.

In some examples, a cryptlet tunnel (e.g., cryptlet tunnel 468) is dynamically established between a Hardware Security Module (e.g., Key Vault 465) and an enclave (e.g., enclave 471) for the purposes of securely transmitting private keys or secrets that are stored in the HSM to the cryptlet running within the enclave. This may also allow cryptlets to create new keys in an enclave and store them to an HSM securely through the tunnel. In some examples, secrets may be exchanged in both directions (enclave to HSM and HSM to enclave). In some examples, the cryptlet tunnel is created at runtime via the enclave and HSM securely sharing session keys to construct a short-lived tunnel for the exchange of these keys for the active cryptlet. In some examples, the keys that are fetched into an enclave via the cryptlet tunnel are only in enclave memory are destroyed when the cryptlet is closed or faulted.

In some examples, an intermediary device may be used in the cryptlet tunnel rather than directly connecting the HSM and the enclave. For instance, in some examples, a host virtual machine of the enclave is used as a broker, in which the host virtual machine brokers the connection for the enclave, although the decryption is still performed in the enclave itself.

In some examples, a user may have a user token that can be passed and mapped to a key in Key Vault 465. In this way, in some examples, the user token/identity token is bound to the identity that owns the key. When activities associated with the user are performed in an enclave, the user's key may be fetched from Key Vault 465 using cryptlet tunnel 468, e.g. in order to sign on behalf of the user using the user's key. Use of cryptlet tunnel 468 may allow the key to be communicated securely between the enclave and Key Vault 465. In some examples, the user token is included in cryptlet binding.

In some examples, once the secure tunnel is in place, the enclave requests the cryptlet keychain. The cryptlet keychain may include the key pair for the cryptlet that is used for signing and/or executing the payloads created by the cryptlet. The cryptlet keychain may also include a key pair for any counterparties (e.g., user, IoT device) that the cryptlet can "sign on behalf of"). The cryptlet keychain may also include any secrets defined in the contract binding, such a shared secret between counterparties or a single party such as contract terms that a party or parties do not want visible on the blockchain. The entire cryptlet keychain is not necessarily stored in the same location, and the cryptlet binding key graph may be used to determine the location of the counterparty key pairs. When different components of the cryptlet keychain are stored in more than one location, a separate secure tunnel may be used for communication with each location.

Once the enclave keychain is obtained, the instance of the cryptlet may be provided, and the cryptlet may be provided with the cryptlet's keychain and binding in the constructor or initialization. In some examples, the cryptlet executes the cryptlet code and any output is/can be signed by the private keys in the cryptlet keychain. In some examples, the payload is then handed to the CryptletContainer for the enclave signature to be created around that payload providing the enclave attestation. The signatures may be part of a signature onion. For instance, in some examples, the signature onion may include a signature by the enclave key, a signature by the cryptlet key, a signature by a blockchain-specific key, and a signature of another enclave, resulting in a four-layer signature onion proving a chain of proof with four layers of attestation in these examples.

Examples herein have been given of secure cryptlet tunnels for cryptlets used in conjunction with a blockchain network. However, secure cryptlet tunnels may also be used for cryptlets in other contexts, some of which involve a blockchain network and some of which do not involve a blockchain network. That is, secure cryptlet tunnels may be used in applications that do not involve blockchain networks.

In some examples, Cryptlet Binding Key Graph 490 provides a multi-party key registry for locating keys and their appropriate storage endpoint. For example, in a multi-party compute scenario where one counterparty's keys are stored in a Key Vault on the same network as Cryptlet Fabric 460, and another's is in a separate on-premises HSM, Cryptlet Fabric 460 will need to be able to direct the CryptletContainer to an endpoint to build a Cryptlet Key Tunnel. For instance, in some examples, the HSM storing one counterparty key may have a location in a private network that is separate from location of the network of another HSM that stores another counterparty key to be used by the same cryptlet.

In some examples, the Cryptlet Binding provides the data needed to query Cryptlet Binding Key Graph 490. In some examples, in response to the Cryptlet Binding, Cryptlet Binding Key Graph 490 returns endpoints for each counterparty to Cryptlet Fabric 460. As such, Cryptlet Binding Key Graph 490 may operate in a manner similar to a look-up table. Cryptlet Binding Key Graph 490 may be used support multiple Key Vaults and dynamic creation of Cryptlet Key Tunnels.

In some examples, the permission for particular keys are bound to the identity that owns the keys. When the binding ID is passed to the cryptlet container, it may include the user tokens that acts as identity tokens for the keys to be retrieved from the Key Vaults. In some examples, when the Cryptlet Container requests the keys from the key vaults via secure tunnel, the request also includes the token for the identity that is coming in to the request.

As discussed above, a cryptlet's lifetime may span multiple enclaves. In some examples, the secure cryptlet tunnel provides a way of persisting secrets across multiple enclaves, in that each enclave can communicate with an HSM that persistently stores the secrets.

In some examples, each enclave may have stored on the enclave a public enclave key and a private enclave key. In some examples, the private enclave key is etched in silicon.

When cryptlet fabric 460 allocates, from the enclave pool, an enclave (e.g., enclave 471) so that the enclave can execute a cryptlet, after allocating the enclave, cryptlet fabric 460 may fetch cryptlet code and/or other relevant information, or this information and code may have been fetched prior to allocating the enclave. Cryptlet fabric 460 may then inject the Cryptlet Container into enclave 471.

Cryptlet fabric 460 may then generate the cryptlet binding. Cryptlet fabric 460 may then determine any HSM location that will be needed for retrieving keys. In some examples, based on the cryptlet binding, for each key that is needed, the cryptlet binding hashID or user token/identity token resolves to either a cryptlet instance ID or a counterparty ID. In some examples, for a counterparty ID, the location of the corresponding counterparty key is determined based on the cryptlet binding key graph. Cryptlet fabric 460 may communicate cryptlet binding information (e.g., the cryptlet binding) to cryptlet binding key graph 490. In some examples, cryptlet binding key graph 490 then determines the HSM locations for the corresponding counterparty key(s) based on counterparty information contained in the cryptlet binding information. Cryptlet binding key graph 490 may then communicate the HSM locations to cryptlet fabric 460. Cryptlet fabric 460 may then send the HSM locations to the Cryptlet Container.

The Cryptlet Container may then derive a session public/private enclave key pair, including a session enclave private key and a session enclave public key, from the enclave key pair, and the session enclave public key may be communicated from the Cryptlet container to the HSM (e.g., Key Vault 465). Key Vault 465 may derive a session public/private HSM key pair, including a session HSM private key and a session HSM public key, from an HSM key pair. The session HSM public key may be communicated from Key Vault 465 to the cryptlet container. At this point, the secure tunnel has been established between enclave 471 and Key Vault 465. If there is more than one HSM from which secrets need to be retrieved or to which secrets need to be stored, a separate secure tunnel may be established for each HSM.

The cryptlet binding for the allocated cryptlet may then be communicated from cryptlet fabric 460 to the cryptlet container. A request for a cryptlet keychain for the allocated cryptlet may then be communicated from the cryptlet container to the relevant HSM (e.g., Key Vault 465). Key Vault 465 may encrypt HSM secrets (e.g., secrets that are to be sent to the cryptlet container) with the session enclave public key. In some examples, rather than sending the actual keys, Key Vault 465 derives one-time use keys from the actual keys. The encrypted HSM secrets may then be communicated from Key Vault 465 to the cryptlet container. As discussed above, in some examples, not all of the keys for the cryptlet keychain are stored in the same HSM, and accordingly obtaining all of the keys in the cryptlet keychain may require communication with more than one HSM. The cryptlet container may then decrypt the encrypted HSM secrets with the session enclave private key.

The cryptlet container may then use information in the cryptlet binding to request the cryptlet binary from secure storage. The cryptlet container may then receive the cryptlet binary in response to the request.

Enclave 471 may then execute the cryptlet binary. The cryptlet may sign and/or encrypt the payload of the cryptlet code execution. In some examples, the cryptlet signs and/or encrypt the payload of the cryptlet code execution with the enclave private key (or a derived version of the enclave private key), and signs the payload of the cryptlet code execution with the private enclave key (or a derived version of the enclave private key). The payload may then be communicated from enclave 471 to cryptlet fabric 460.

Enclave 471 may then encrypt new enclave secrets, if there are any. The new enclave secrets may then be communicated from enclave 471 to Key Vault 465. As discussed above, in some examples, not all secrets are sent to the HSM, but rather, some secrets may be sent to one HSM while other secrets are sent to one or more other HSMs. The HSMs may then decrypt the encrypted enclave secrets. The HSMs may then save the decrypted enclave secrets.

Cryptlet fabric 460 may then de-allocate enclave 471 and return enclave 471 to the enclave pool.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 5:
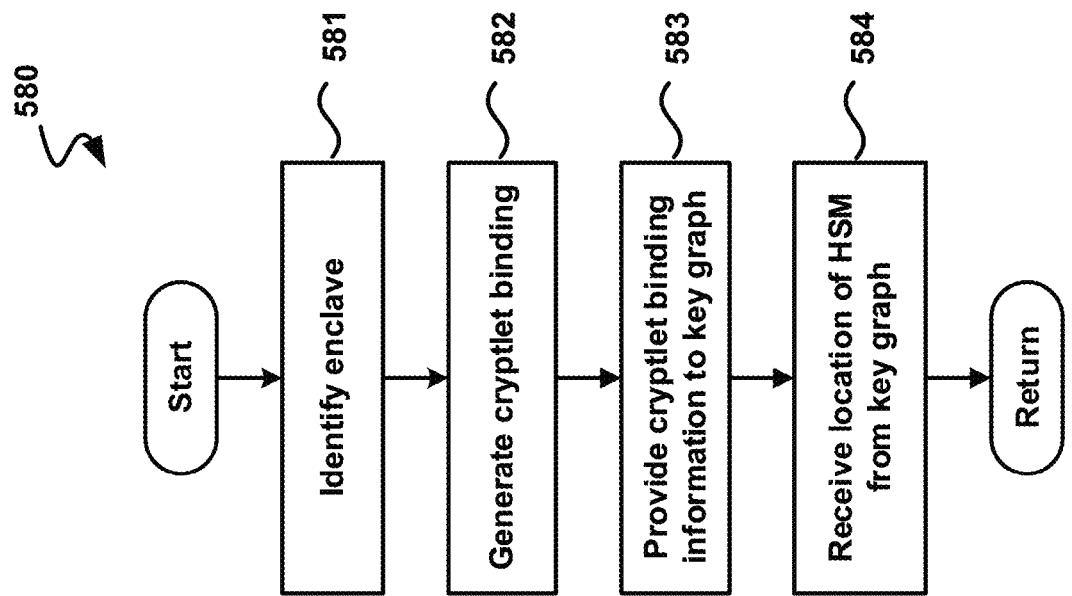
FIG. 5 is an example dataflow for a process, in accordance with aspects of the present disclosure.

FIG. 5 is a flow diagram illustrating an example process (580) for secure transactions and confidential execution of logic, that may be performed by a cryptlet fabric, such as the cryptlet fabric of FIG. 3 and/or FIG. 4.

In the illustrated example, step 581 occurs first. At step 581, in some examples, a first enclave to be used for executing a cryptlet binary of a first cryptlet is identified/allocated. In some examples, the first enclave is a secure execution environment, the first enclave stores an enclave private key, and the first cryptlet is associated with at least a first counterparty. As shown, step 582 occurs next in some examples. At step 582, in some examples, a cryptlet binding that is associated with the first cryptlet is generated/provided. In some examples, the cryptlet binding includes counterparty information that is associated with at least the first counterparty.

As shown, step 583 occurs next in some examples. At step 583, in some examples, cryptlet binding information is provided/communicated to a cryptlet binding key graph. As shown, step 584 occurs next in some examples. At step 584, in some examples, a location of a first hardware security module (HSM) that stores a key that is associated with the first counterparty is received from the cryptlet binding key graph. The process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. An apparatus, comprising:
a device including at least one memory adapted to store run-time data for the device, and at least one processor that is adapted to execute processor-executable code that, in response to execution, enables the device to perform actions, including:
identifying a first enclave to be used for executing a cryptlet binary of a first cryptlet, including execution of smart contract logic associated with a first smart contract having at least a first counterparty, wherein the first enclave is a secure execution environment enabling code to be run in an isolated, private environment and for which results of the secure execution are capable of being attested to have run unaltered and in private, the first enclave stores an enclave private key, and wherein the first cryptlet is associated with at least the first counterparty;
after identifying the first enclave, injecting a cryptlet container into the first enclave, wherein the first enclave is a hardware enclave;
generating a cryptlet binding that is associated with the first cryptlet, wherein the cryptlet binding includes counterparty information that is associated with at least the first counterparty;
providing cryptlet binding information to a cryptlet binding key graph; and
receiving, from the cryptlet binding key graph, a location of a hardware security module (HSM) that stores a key that is associated with the first counterparty.

2. The apparatus of claim 1, wherein the first cryptlet is further associated with at least a second counterparty; the actions further include receiving, from the cryptlet binding key graph, a location of a second hardware security module that stores a key that is associated with the second counterparty; the location of the key that is associated with the first counterparty is on a first network; the location of the key that is associated with the second counterparty is on a second network; and wherein the second network is a private network that is separate from the first network.

3. The apparatus of claim 1, the actions further including:
communicating the cryptlet binary, the cryptlet binding, and the location of the first hardware security module to the first enclave.

4. The apparatus of claim 1, wherein the cryptlet binding information is the cryptlet binding.

5. The apparatus of claim 1, wherein the HSM is a key vault.

6. The apparatus of claim 1, the actions further including:
after identifying the first enclave, injecting a cryptlet container into the first enclave.

7. The apparatus of claim 1, wherein the enclave is a private, tamper-resistant execution environment that is secure from external interference.

8. The apparatus of claim 1, wherein the enclave is at least one of a Virtual Secure Machine or a secure hardware enclave.

9. The apparatus of claim 1, wherein persistent storage of the key that is associated with the first counterparty is not permitted outside of the first HSM.

10. The apparatus of claim 1, wherein the enclave is a hardware enclave, and wherein the enclave private key of the enclave is etched in silicon.

11. The apparatus of claim 1, the actions further including establishing a secure encrypted communication tunnel between the enclave and the HSM.

12. The apparatus of claim 11, wherein establishing the secure encrypted communication tunnel includes:
deriving a session public/private enclave key pair, including a session enclave private key and a session enclave public key, from the enclave private key and an enclave public key;
sending the session enclave public key to the HSM;
receiving, from the HSM, a session HSM public key;
encrypting additional information with the session enclave private key;

sending the encrypted additional information to the HSM;
receiving further encrypted information from the HSM; and
decrypting the further encrypted information with the session enclave private key.

13. A method, comprising:
allocating a first enclave for execution a cryptlet binary of a first cryptlet, wherein the first cryptlet is configured to execute smart contract logic associated with a first smart contract having at least a first counterparty, and wherein the first enclave is a secure execution environment enabling code to be run in an isolated, private environment and for which results of the secure execution are capable of being attested to have run unaltered and in private;
after allocating the first enclave, injecting a cryptlet container into the first enclave, wherein the first enclave is a hardware enclave;
providing a cryptlet binding that is associated with the first cryptlet, wherein the cryptlet binding includes counterparty information that is associated with at least the first counterparty;
communicating cryptlet binding information to a key graph; and
receiving, from the key graph, an address that is associated with a hardware security module (HSM) that stores a key that is associated with the first counterparty.

14. The method of claim 13, wherein the first cryptlet is further associated with at least a second counterparty, the method further comprising receiving, from the cryptlet binding key graph, a location of a second hardware security module that stores a key that is associated with the second counterparty, wherein the location of the key that is associated with the first counterparty is on a first network, the location of the key that is associated with the second counterparty is on a second network, and wherein the second network is a private network that is separate from the first network.

15. The method of claim 13, further comprising establishing a secure encrypted communication tunnel between the enclave and the HSM.

16. The method of claim 15, wherein establishing the secure encrypted communication tunnel includes:
deriving a session public/private enclave key pair, including a session enclave private key and a session enclave public key, from the enclave private key and an enclave public key;
sending the session enclave public key to the HSM;
receiving, from the HSM, a session HSM public key;
encrypting additional information with the session enclave private key;
sending the encrypted additional information to the HSM;
receiving further encrypted information from the HSM; and
decrypting the further encrypted information with the session enclave private key.

17. A processor-readable storage medium, having stored thereon processor-executable code that, upon execution by at least one processor, enables actions, comprising:
injecting a cryptlet container into a first enclave, wherein the first enclave is a hardware enclave;
providing cryptlet binding information that is associated with the first cryptlet, wherein the first enclave is a secure execution environment enabling code to be run in an isolated, private environment and for which results of the secure execution are capable of being attested to have run unaltered and in private, the first enclave stores an enclave private key, the first cryptlet is configured to execute smart contract logic associated with a first smart contract having at least a first counterparty, and wherein the cryptlet binding includes counterparty information that is associated with at least the first counterparty;
sending the cryptlet binding information to a key graph; and
receiving, from the key graph, a location of a first hardware security module (HSM) that stores a key that is associated with the first counterparty.

18. The processor-readable storage medium of claim 17, wherein the first cryptlet is further associated with at least a second counterparty, the actions further comprising receiving, from the cryptlet binding key graph, a location of a second hardware security module that stores a key that is associated with the second counterparty, wherein the location of the key that is associated with the first counterparty is on a first network, the location of the key that is associated with the second counterparty is on a second network, and wherein the second network is a private network that is separate from the first network.

19. The processor-readable storage medium of claim 17, the actions further comprising establishing a secure encrypted communication tunnel between the enclave and the HSM.

20. The processor-readable storage medium of claim 19, wherein establishing the secure encrypted communication tunnel includes:
deriving a session public/private enclave key pair, including a session enclave private key and a session enclave public key, from the enclave private key and an enclave public key;
sending the session enclave public key to the HSM;
receiving, from the HSM, a session HSM public key;
encrypting additional information with the session enclave private key;
sending the encrypted additional information to the HSM;
receiving further encrypted information from the HSM; and
decrypting the further encrypted information with the session enclave private key.

* * * * *